(12) United States Patent
Lewis et al.

(10) Patent No.: US 11,258,624 B2
(45) Date of Patent: Feb. 22, 2022

(54) SYSTEM AND METHOD FOR PROVIDING REMOTE SITE SECURITY FOR INFORMATION HANDLING SYSTEMS IN A PROTECTED NETWORK

(71) Applicant: DELL PRODUCTS, LP, Round Rock, TX (US)

(72) Inventors: Jonathan F. Lewis, Round Rock, TX (US); Kevin W. Mundt, Austin, TX (US); Lee E. Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 16/869,118

(22) Filed: May 7, 2020

(65) Prior Publication Data

US 2021/0351948 A1    Nov. 11, 2021

(51) Int. Cl.
| | | |
|---|---|---|
| *H04L 12/28* | (2006.01) | |
| *H04L 29/06* | (2006.01) | |
| *H04L 67/562* | (2022.01) | |
| *H04L 41/12* | (2022.01) | |

(52) U.S. Cl.
CPC .............. *H04L 12/28* (2013.01); *H04L 41/12* (2013.01); *H04L 63/0263* (2013.01); *H04L 63/0876* (2013.01); *H04L 63/1425* (2013.01); *H04L 67/2809* (2013.01)

(58) Field of Classification Search
CPC ...... H04L 12/18; H04L 41/12; H04L 63/0263
See application file for complete search history.

(56) References Cited

U.S. PATENT DOCUMENTS

| | | | |
|---|---|---|---|
| 9,166,438 B2 | 10/2015 | Sultenfuss et al. | |
| 9,467,441 B2 | 10/2016 | Ballard | |
| 2018/0176036 A1 | 6/2018 | Butcher et al. | |
| 2018/0242154 A1 | 8/2018 | Ballard et al. | |
| 2019/0044793 A1* | 2/2019 | Chew .................. | H04L 41/5019 |
| 2021/0051177 A1* | 2/2021 | White .................... | H04L 63/20 |

\* cited by examiner

*Primary Examiner* — Zhensheng Zhang
(74) *Attorney, Agent, or Firm* — Larson Newman, LLP

(57) ABSTRACT

A network interface card includes a memory configured to store a credential associated with one of a manufacturer of the network interface card, a particular manufacturer of the server that includes the network interface card, or another manufacturer of an enclosure that holds the network interface card. A processor performs network discovery to identify devices in a local area network, performs port configuration, and establishes a secure network connection with a cloud service broker. Subsequent to the establishment of the secure network connection, the processor submits a provisioning request to the cloud service broker, receives a response to the provisioning request, and applies the security policies to the network interface card, wherein the security policies are for the devices of the local area network.

20 Claims, 3 Drawing Sheets

SYSTEM AND METHOD FOR PROVIDING REMOTE SITE SECURITY FOR INFORMATION HANDLING SYSTEMS IN A PROTECTED NETWORK

FIELD OF THE DISCLOSURE

The present disclosure generally relates to information handling systems, and more particularly relates to providing remote site security for information handling systems in a protected network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A network interface card includes a memory configured to store a credential associated with one of a manufacturer of the network interface card, a particular manufacturer of the server that includes the network interface card, or another manufacturer of an enclosure that holds the network interface card. A processor performs network discovery to identify devices in a local area network, performs port configuration, and establishes a secure network connection with a cloud service broker. Subsequent to the establishment of the secure network connection, the processor submits a provisioning request to the cloud service broker, receives a response to the provisioning request, and applies the security policies to the network interface card, wherein the security policies are for the devices of the local area network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
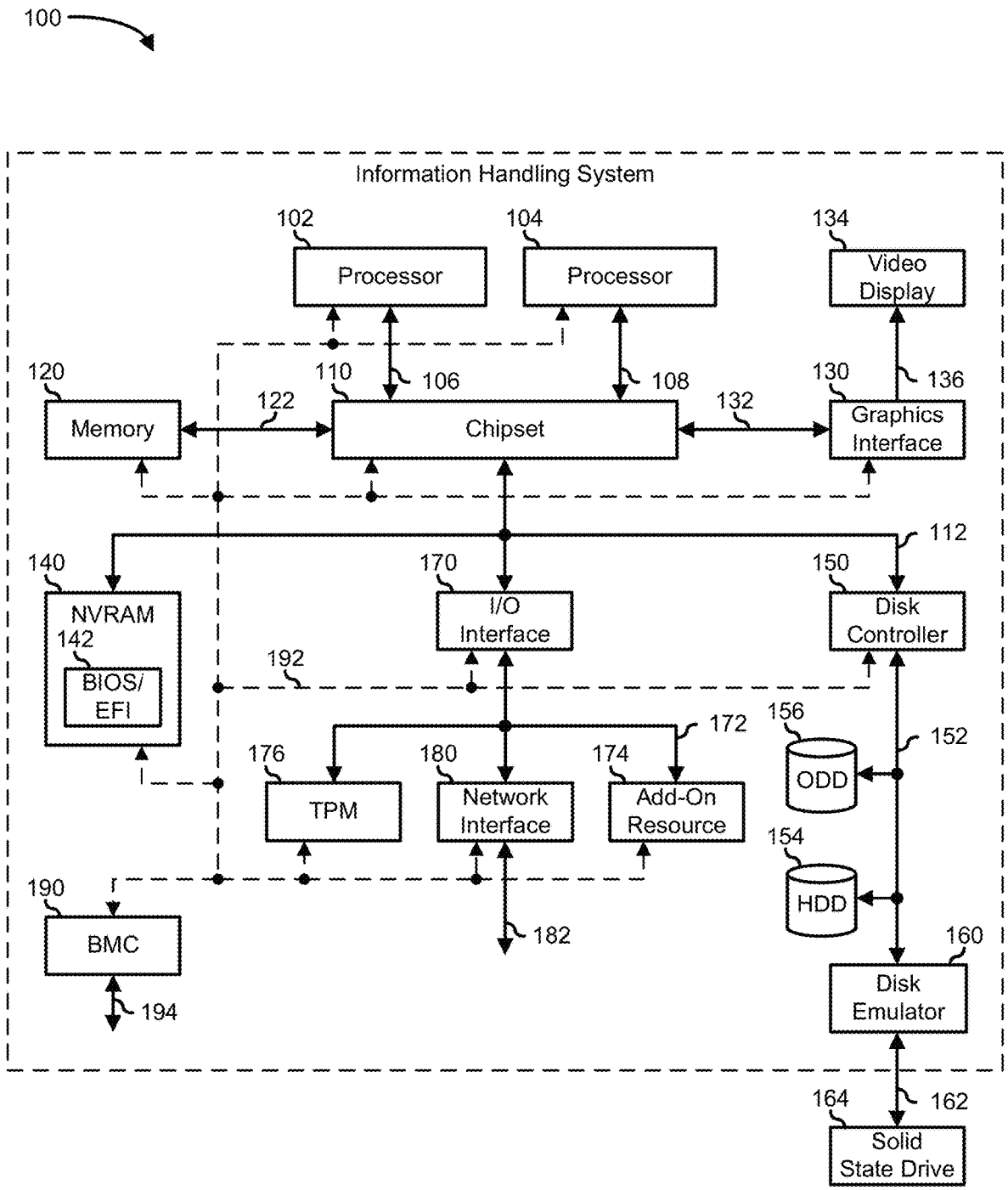
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated. Information handling system 100 can include additional buses and bus protocols, for example, I2C and the like.

Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Companies generally impose security policies, firewalls, and tools to protect company servers and client workstations in a local area network on each one of the company servers and the client workstations. Maintaining the security capabilities on each of these company servers and the client workstations requires constant updates. A system and method are described in the present disclosure for providing remote site security for information handling systems in the local area network.

Figure 2:
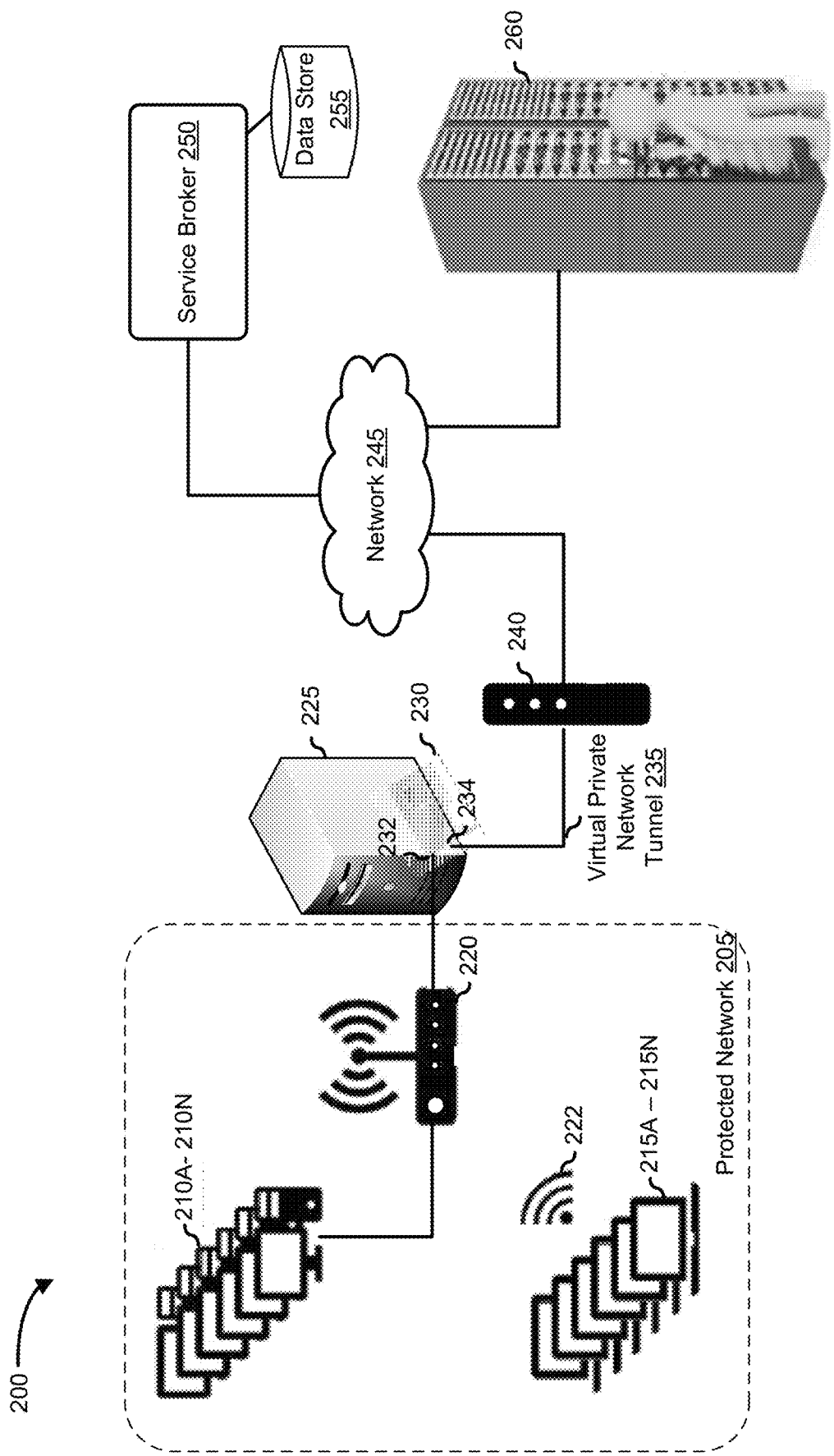
FIG. 2 is a block diagram illustrating an example of a system for providing remote site security for information handling systems in a protected network.

FIG. 2 illustrates an example of environment 200, where a system for providing remote site security for information handling systems in a protected network is depicted. Environment 200 includes a protected network 205, a server 225, a network connection device 240, a network 245, a service broker 250, a data store 255, and a data center 260.

Protected network 205 may be implemented as, or maybe a part of, a storage area network (SAN), a personal area network (PAN), a local area network (LAN), a wireless local area network (WLAN), a campus area network (CAN), an intranet, or another appropriate architecture or system that facilitates the communication of signals, data, and/or messages between information handling systems in a company or business entity. Protected network 205 includes one or more client devices such as wired client devices 210A-210N, wireless client devices 215A-215N, a network switch 220, and a wireless access point 222. Each one of wired client devices 210A-210N and wireless client devices 215A-215N may be similar to information handling system 100 of FIG. 1. Wired client devices 210A-210N and wireless client devices 215A-215N may be client workstations, point of sale devises, point of sale devices, etc. that are connected to network switch 220 and/or wireless access point 222. Network switch 220 may be a networking hardware that connects wired client devices 210A-210N and wireless client devices 215A-215N by using packet switching to receive and forward data to a destination client device via a network address. Network switch 220 may be coupled to a network interface card 230 in server 225 which may be remote to protected network 205.

Server 225 may include a network interface card 230 which may be a suitable system, apparatus, or device operable to serve as an interface between an information handling system and a network. Network interface card 230 may enable each one of wired client devices 210A-210N and wireless client devices 215A-215N to communicate with service broker 250 over network 245 using suitable transmission protocol and/or standard via network connection device 240. Network interface card 230 may be a smart network card such as an SoC. Network interface card 230 may be a compute entity or an integrated circuit that includes a CPU, memory, an I/O port and a secondary storage. Although shown as part of server 225, network interface card 230 may be implemented as a stand-alone security device which may be placed in an enclosure.

Network interface card 230 may be configured to initiate an automated network discovery procedure and automated port configuration when initially powered on or by some configurable event such as when network cables are initially attached. Automated network discovery may be performed using link layer discovery protocol (LLDP), traceroute, simple network management protocol (SNMP), snooping dynamic host configuration protocol (DHCP) traffic, and other techniques. Automated network discovery may include performing an inventory of devices within protected network 205 such as wired client devices 210A-210N and wireless client devices 215A-215N and network switch 220. Network interface card 230 may have at least two network ports such as port 232 and port 234. One of the network ports may be connected to network switch 220. The other network port may be connected to network connection device 240 which may be a network service provider's router that connects network interface card 230 to network 245. As shown, port 232 is connected to protected network 205 via network switch 220 and port 234 is connected to network 245 via network connection device 240. This connection may be the sole network connection to network 245 of protected network 205. Automated port configuration procedure, that is configuring the ports of network interface card 230, may include determining and compensating for incorrect cabling of the network ports, such as local area network (LAN) and wide area network (WAN) ports. For example, network interface card 230 may be incorrectly cabled if the LAN cable is connected to the WAN port and the WAN cable is connected to the LAN port. The determination may include detecting which one of the cables that are connected to the ports of network interface card 230 is connected to network switch 220 versus the one that is connected to network connection device 240. Network interface card 230 may transmit DHCP requests to network switch 230 and network connection device 240. A DHCP server in network 245 may respond to the DHCP request via network connection device 240. As such, the DHCP response may be received at port 234 of network interface card 230. The response may include configuration information such as an Internet Protocol (IP) address of the DHCP server. Thus, port 234 may be determined as the port connected to network 245, that is the WAN port and port 232 as the port connected to the protected network 205 that is the LAN port.

Network interface card 230 may also be configured to perform an automated provisioning procedure. The automated provisioning procedure may be subsequent to the automated network discovery procedure and/or automated port configuration procedure. The automated provisioning procedure may include establishing a secure connection such as a virtual private network tunnel 235. Virtual private network tunnel 235 may be a transport layer security (TLS) connection to a cloud-based service broker such as service broker 250. Virtual private network tunnel 235 may be the only connection of devices in protected network 205 to network 245. Network interface card 230 may have been shipped to a customer enterprise with a private key or digital certificate associated with the manufacturer of the network interface card installed at manufacture. The digital certificate may be presented by network interface card 230 to service broker 250 for authentication when establishing the secure connection. In addition, network interface card 230 may provide other credentials to service broker 250 such as an administrator username/password. Subsequent to the establishment of the secure connection, network interface card 230 may receive automated provisioning services from service broker 250. Provisioning services include deployment of customer-specific rules and/or policies. The provisioning services provided may be customized respective to the preference of the customer associated with network interface card 230. Each of the customers may customize their respective provisioning services during the purchase of a network interface card or configured prior to or during the provisioning process.

Network interface card 230 may include an embedded controller which may include computing, traffic monitoring, filtering, and forwarding capabilities. As such, network interface card 230 may perform as a data security guardian for components or devices in protected network 205 such as wired client devices 210A-210N and wireless client devices 215A-215N an additional dedicated appliance. Network interface card 230 may include customer security rules and/or policies deployed by the manufacturer. The monitoring capabilities may include monitoring network and client/server traffic between protected network 205 and network 245. In addition, network interface card 230 may be configured to apply quality of service (QOS) policies to give preference to applications deemed desirable by an administrator or via a set of rules and/or policies. Network interface card 230 may also be configured to receive firmware and/or software updates from service broker 250.

Network 245 may be implemented as or a part of a metropolitan area network (MAN), a WAN, an intranet, the internet or another appropriate architecture or system that facilitates the communication of signals, data and/or messages. For example, network 245 may include a public or private cloud services interconnection network. For example, network 245 may be configured to provide connectivity to service broker 250. Network 245 may transmit data using a desired storage and/or communication protocol including, but not limited to, Fibre Channel, Frame Relay, Asynchronous Transfer Mode (ATM), IP, other packet-based protocol, SCSI, Internet SCSI (iSCSI), Serial Attached SCSI (SAS), or other transport that operates with the SCSI protocol.

Network connection device 240 may include any one of a variety of information handling devices configured to receive and transmit packetized data such as a router. Network connection device 240 may be configured with one or more network interfaces to allow wired client devices 210A-210N and wireless client devices 215A-215N to communicate to service broker 250 and/or data center 260 via network 245. Network connection device 240 may be a modem from an internet service provider (ISP).

Service broker 250 may include various network-accessible distributed systems or services. For example, service broker 250 may include a cloud storage service and/or data store 255 for storing data files in the cloud. Service broker 250 may be configured to push customer-specific rules and policies to each one of network interface cards connected to service broker 250 such as network interface card 230. These customer-specific rules and policies may include firewall rules and a set of rules and policies that capture and block specific threats. The customer-specific rules and policies may also include rules and/or policies to capture network telemetry data, metadata and sample traffic. Service broker 250 may use artificial intelligence to learn traffic patterns and report or block anomalies based on the captured network telemetry data, metadata, and sample traffic.

Service broker 250 may be a cloud service and may include firmware as a service (FWaaS) or software as a service (SaaS) delivery point. Service broker 250 may also manage the lifecycle of network interface card 230 by transmitting firmware and/or software updates to firmware and/or software components of network interface card 230 which may be backed up at service broker 250 or server 225. As such, service broker 250 may be configured to download firmware, software and/or configuration settings associated with network interface card 230 should its hardware is replaced. One of skill in the art may recognize additional cloud services that may be implemented as service broker 250. Data center 260 may include one or more information handling systems such as application servers and storage resources configured to host service broker 250 and data store 255. Data store 255 may be configured with data that allow service broker 250 to identify the customer associated with network interface card 230, for example, when network interface card 230 issues a provisioning request to service broker 250.

In one embodiment, one server 225 with network interface card 230 may be configured for each protected area network of an organization or facility. In some embodiments, there may be more than one server with a network interface card configured for each protected area network. In yet another embodiment, server 225 may have more than one network interface cards for each protected area network.

Figure 3:
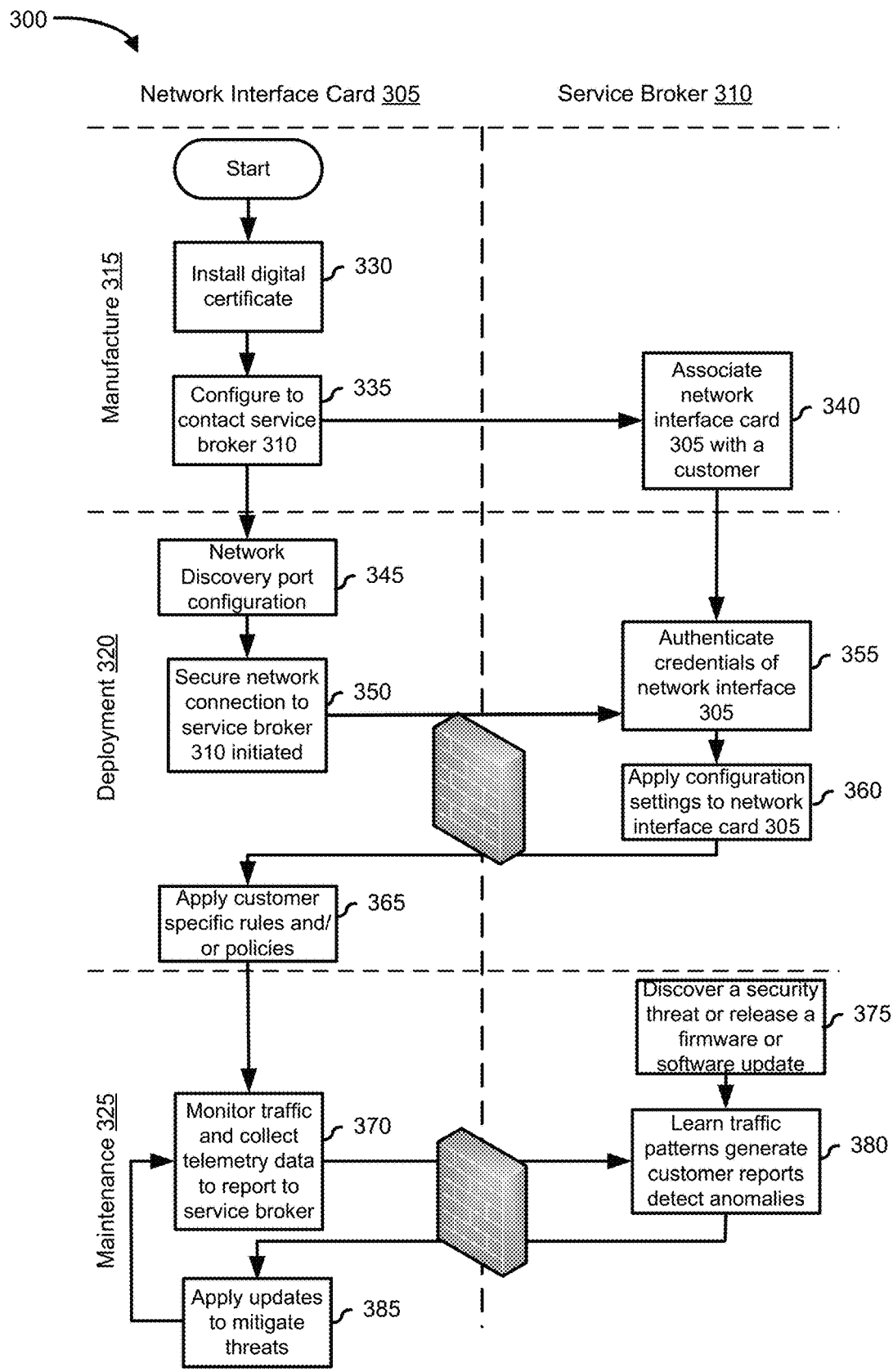
FIG. 3 is a flowchart illustrating an example of a method for providing remote site security for information handling systems in a protected network.

FIG. 3 illustrates a method 300 for providing remote site security for information handling systems in a protected network. Method 300 may be performed by one or more components of FIG. 2. Method 300 may include three phases, a manufacture 315 phase, a deployment 320 phase, and a maintenance 325 phase. Manufacture 315 phase may be performed during the manufacture of the network interface card or during the manufacture of a server or enclosure that includes the network interface card prior to shipment to a customer. The customer may purchase network interface card 315 to be installed at a server onsite. In another embodiment the customer may purchase the server or the enclosure with network interface card 315. Manufacture 315 phase includes block 330, block 335, and block 340. Deployment 320 phase, which may be performed upon initial power on through provisioning of the network interface card, includes block 345, block 350, block 355, block 360, and block 365.

Method 300 typically starts at block 330 wherein a digital certificate is installed at a network interface card 305. The digital certificate may be associated with the manufacturer of network interface card 305 or the manufacturer a server or an enclosure with network interface card 305. Network interface card 305 may be a smart network interface card similar to network interface card 230 of FIG. 2. Network interface card 305 may have a unique identifier such as a service tag assigned to it.

At block 335, network interface card 305 may be configured to establish a secure connection with a service broker 310 upon initial power on or upon the occurrence of a particular event, such as a network connection. Service broker 310 may be a cloud service broker similar to service broker 250 of FIG. 2. Service broker 310 may be associated with one of the manufacturer of network interface card 305, the server, or the enclosure. In another embodiment, service broker 310 may be a third-party service broker that handles the maintenance of network interface cards for a particular manufacturer.

At block 340, a customer may purchase the server or the enclosure with network interface card 305. The customer may be a company or a business entity. The purchase of the network interface card 305 may include a purchase of a security service associated with service broker 310. The customer and/or purchase order associated with the purchase may have a unique identifier and/or credential which may then be associated with network interface card 305. Service broker 310 may maintain data storage such as a database or a file system that manages the credentials and/or identifiers associated with network interface card 305, the customer, the purchase order, etc. The customer may determine and/or identify security rules and/or policies to be installed at network interface card 305 during the deployment or the provisioning of network interface card 305.

At block 345, the server and/or network interface card 305 may be powered on at the customer's site. Network cables may also be attached to network interface card 305. Network interface card 305 may then perform automated network topology discovery utilizing various techniques such as LLDP. Network interface card 305 may also perform automated port configuration. Network interface card 305 may be configured to determine if the network cables are correctly attached to its ports such as the LAN and WAN ports. If the network cables are incorrectly attached, then network interface card 305 may compensate for the error. If network interface card 305 detects an error beyond what it can compensate and it has a network connection, then network interface card 305 may contact service broker 310. Service broker 310 may then contact the customer or post information associated with the error at a secure site for the customer to access. Service broker 310 may have a storage device that stores contact information of the customer along with an identifier respective of the customer and/or network interface card 305. In addition, the storage device may store security rules and policies associated with the customer and/or network interface card 305. If there is no network connection, then network interface card 305 may log the error to assist in troubleshooting. The log may be retrieved by an administrator of the customer through an interface at the server. In addition, the log may be retrieved by the administrator by connecting a client device to network interface card 305 such as via a web browser.

At block 350, network interface card 305 may establish a secure network connection to service broker 310 such as a TLS connection. Network interface card 305 may use the digital certificate as a credential to establish trust between network interface card 305 and service broker 310. The provisioning request may include other identifying information and/or credential. The identifying information may include a media access control (MAC) address, a serial number, a service tag, etc. The credential may be a username/password of the administrator. Network interface card 305 may also include location information determined at startup such as local IP address, domain name, etc. The TLS session is a secure encrypted connection that may be used for a secure data exchange between network interface card 305 and service broker 310. Subsequent to establishing the secure connection, network interface card 305 may issue a provisioning request such as a Simple Object Access Protocol (SOAP) request or a JavaScript Object Notation (JSON) request to service broker 310.

At block 355, service broker 310 may authenticate the credential(s) submitted by network interface card 305. Service broker 310 may also validate the identification information against a list of authorized or whitelisted identification information. The identification information of network interface card 305 may have been added to the list upon purchase of network interface card 305 by the customer.

At block 360, after a successful authentication process, a zero-touch provisioning or fully automatic setup may proceed. This may include the application of configuration settings, such as to identify a location where credentials and customer-specific rules and/or policies are to be stored or applied. The credentials may be used for subsequent provisioning requests. Service broker 310 may transmit a provisioning response to the provisioning request. The provisioning response may include the customer-specific rules and/or policies. Network interface card 305 may also authenticate the provisioning response received from service broker 310.

At block 365, network interface card 305 may apply or deploy the customer-specific rules and/or policies. The current configuration settings, firmware, and/or software of network interface card 305 may also be backed up at the server or the service broker. If there is a hardware issue with network interface card 305 and the hardware is replaced, the new network interface card may be configured to download and install the backed-up configuration settings, firmware, and/or software. The new network interface card may also deploy the customer-specific rules and/or policies.

At block 370, network interface card 305 may monitor the network traffic and client/server traffic associated with a protected area network based on the customer-specific rules and/or policies. The customer-specific rules and/or policies may include firewall rules to capture and block specific threats. The customer-specific rules and/or policies may include rules or policies to capture and collect network telemetry, metadata, client/server traffic, and network traffic. The network telemetry, metadata, client/server traffic and sample network traffic may be transmitted to service broker 310. In addition to monitoring network traffic and client/server traffic, the network interface card can apply QoS policies to give preference to desirable applications.

At block 375, service broker 310 may discover a security threat or anomaly. As new threats are discovered or if new versions of the network interface card's firmware and/or software are released, then the new versions of the firmware and/or software may be published or pushed by the service broker to network interface card 305. Service broker 310 may also apply changes to the customer-specific rules and/or policies.

At block 380, service broker 310 may analyze the security threat or anomaly. In addition, service broker 310 may also analyze the network telemetry, metadata, client/server traffic, and sample network traffic received from network interface card 305. Service broker 310 may perform the analysis to determine patterns and/or generate reports. Service broker 310 may determine the patterns by applying artificial intelligence. Service broker 310 may further discover additional security threats and/or anomalies based on the analysis of the network telemetry, metadata, client/server traffic, and sample network traffic. Service broker 310 may then report, mitigate, or block the anomalies and/or threats. Service broker 310 may also publish or push new firmware or software version updates that address the anomalies and/or threats to network interface card 305. At block 385, network interface card 305 may apply the firmware and/or software updates from service broker 310 to mitigate the threats and/or anomalies. In addition, network interface card 305 may also apply updates to customer-specific rules and/or policies.

Although FIG. 3 show example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 370 and block 375 may be performed in parallel.

As used herein, the term "provisioning" refers to one or more operations used to prepare a client device with systems, data, and/or software, to make it ready for its intended operation. Examples of tasks carried up when provisioning a client device include, but not limited to loading software, customizing and configuring the software to create or change a boot image for the device, change its parameters, such as IP address, IP gateway to find associated network and storage resources, etc.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
performing, by a network interface card, discovery of devices in a local area network associated with the network interface card when triggered by an event that includes initial power on of a server that has the network interface card, wherein the local area network is a protected network that is only accessed via a virtual private network tunnel;
performing port configuration that includes configuring a first port and a second port of the network interface card, wherein the first port is connected to the local area network, and wherein the second port is connected to a wide area network via the virtual private network tunnel, wherein the wide area network is associated with a cloud service broker;
in response to determining that there is proper internet connection, establishing a secure network connection with the cloud service broker;
subsequent to the establishing the secure network connection, submitting a provisioning request to the cloud service broker, wherein the provisioning request includes a digital certificate associated with a manufacturer of the network interface card, a particular manufacturer of the server that includes the network interface card, or another manufacturer of an enclosure that holds the network interface card;
receiving a response to the provisioning request, wherein the response includes customer-specific security rules for the devices in the protected network, wherein the customer-specific security rules are associated with a customer that purchased the network interface card; and
deploying the customer-specific security rules via the network interface card to the devices in the protected network.

2. The method of claim 1, wherein the customer-specific security rules include firewall rules.

3. The method of claim 1, further comprising monitoring network traffic associated the local area network.

4. The method of claim 3, further comprising transmitting the network traffic to the cloud service broker to detect an anomaly based on the network traffic.

5. The method of claim 4, further comprising subsequent to receiving an update to the customer-specific security rules based on the anomaly, updating the customer-specific security rules to mitigate the anomaly.

6. The method of claim 1, wherein the digital certificate is installed by the manufacturer of the network interface card, the particular manufacturer of the server that includes the network interface card, or the another manufacturer of the enclosure that holds the network interface card.

7. The method of claim 1, wherein the cloud service broker is associated with the manufacturer of the network interface card the particular manufacturer of the server that includes the network interface card, or the another manufacturer of the enclosure that holds the network interface card.

8. The method of claim 7, wherein the network interface card provides an only connection to the wide area network.

9. A network interface card, comprising:
a memory configured to store a digital certificate associated with a manufacturer of the network interface card, a particular manufacturer of a server that includes the network interface card, or another manufacturer of an enclosure that holds the network interface card, wherein the digital certificate is installed by the manufacturer of the network interface card, the particular manufacturer of the server that includes the network interface card, or the another manufacturer of the enclosure that holds the network interface card; and
a processor configured to:
perform network discovery to identify devices in a local area network associated with the network interface card, wherein the network discovery is performed when triggered by an event that includes initial power on of the server that has the network interface card, wherein the local area network is a protected network that is only accessed via a virtual private network tunnel;
perform port configuration, wherein the port configuration includes determining a first port connected with the local area network and a second port connected to a wide area network via the virtual private network tunnel, wherein the wide area network is associated with a cloud service broker;
in response to determining that there is proper internet connection, establish a secure network connection with the cloud service broker;
subsequent to the establishment of the secure network connection, submit a provisioning request to the cloud service broker, wherein the provisioning request includes the digital certificate associated with the manufacturer of the network interface card, the particular manufacturer of the server that includes the network interface card, or the another manufacturer of the enclosure that holds the network interface card;
receive a response to the provisioning request, wherein the response includes customer-specific security policies for the devices in the protected network, wherein the customer-specific security policies are associated with a customer that purchased the network interface card; and
apply the customer-specific security policies to the devices in the protected network via the network interface card.

10. The network interface card of claim 9, wherein the processor is further configured to monitor client/server traffic at the local area network.

11. The network interface card of claim 10, wherein the processor is further configured to transmit data associated with the client/server traffic to the cloud service broker, and wherein the cloud service broker is configured to detect an anomaly based on the data associated with the client/server traffic.

12. The network interface card of claim 9, wherein the processor is further configured to receive a firmware update and a software update from the cloud service broker.

13. The network interface card of claim 9, wherein the processor is further configured to collect telemetry data to transmit to the cloud service broker.

14. A non-transitory computer-readable medium including code for performing a method, the method comprising:

discovering devices and information handling systems in a local area network associated with a network interface card when triggered by an event that includes initial power on of a server that has the network interface card, wherein the local area network is a protected network that is only accessed via a virtual private network tunnel;

performing port configuration that includes configuring a first port and a second port of the network interface card, wherein the first port is connected to the local area network associated with the network interface card, and wherein the second port is connected to a wide area network via the virtual private network tunnel, wherein the wide area network is associated with a cloud service broker;

in response to determining that there is proper internet connection, establishing a secure network connection with the cloud service broker at the wide area network;

subsequent to the establishing the secure network connection, submitting a provisioning request to the cloud service broker, wherein the provisioning request includes a digital certificate associated with a manufacturer of the network interface card, a particular manufacturer of the server that includes the network interface card, or another manufacturer of an enclosure that holds the network interface card;

receiving a response to the provisioning request from the cloud service broker, wherein the response includes customer-specific security rules for the devices and the information handling systems in the protected network, wherein the customer-specific security rules are associated with a customer that purchased the network interface card; and deploying the customer-specific security rules to the devices and the information handling systems in the protected network via the network interface card.

15. The non-transitory computer-readable medium of claim 14, the method further comprising monitoring network traffic associated with the local area network.

16. The non-transitory computer-readable medium of claim 14, the method further comprising collecting telemetry data associated with the local area network.

17. The non-transitory computer-readable medium of claim 14, the method further comprising deploying a firmware update to mitigate a security threat detected by the cloud service broker.

18. The non-transitory computer-readable medium of claim 14, the method further comprising determining whether the first port and the second port are correctly cabled.

19. The non-transitory computer-readable medium of claim 14, the method further comprising compensating for incorrect cabling of the first port and the second port.

20. The non-transitory computer-readable medium of claim 14, the method further comprising determining whether the network interface card is connected to the wide area network.

* * * * *